United States Patent
Sin et al.

(10) Patent No.: US 9,875,847 B2
(45) Date of Patent: Jan. 23, 2018

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Min Gi Sin, Suwon-si (KR); Kum Jin Park, Suwon-si (KR); Jong Hoon Yoo, Suwon-si (KR); Chi Hwa Lee, Suwon-si (KR); Chang Hak Choi, Suwon-si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 107 days.

(21) Appl. No.: 15/003,597

(22) Filed: Jan. 21, 2016

(65) Prior Publication Data
US 2016/0314900 A1 Oct. 27, 2016

(30) Foreign Application Priority Data
Apr. 23, 2015 (KR) .................. 10-2015-0057314

(51) Int. Cl.
| H01G 4/06 | (2006.01) |
| H01G 4/30 | (2006.01) |
| H01G 4/232 | (2006.01) |
| H01G 4/008 | (2006.01) |
| H01G 4/12 | (2006.01) |
| C03C 10/12 | (2006.01) |
| C04B 35/00 | (2006.01) |

(52) U.S. Cl.
CPC ............. *H01G 4/0085* (2013.01); *H01G 4/12* (2013.01); *H01G 4/30* (2013.01); *H01G 4/1227* (2013.01)

(58) Field of Classification Search
CPC ........ H01G 4/30; H01G 4/232; H01G 4/0085; H01G 4/1227
USPC ............ 361/321.1, 321.2, 311, 301.4; 501/7, 501/134, 136
See application file for complete search history.

(56) References Cited

U.S. PATENT DOCUMENTS

2012/0110807 A1* 5/2012 Kim .................... H01B 1/16
29/25.41

FOREIGN PATENT DOCUMENTS

| JP | 2007-123198 A | 5/2007 |
| JP | 2008-222520 A | 9/2008 |
| JP | 4153206 B2 | 9/2008 |
| KR | 10-1999-0075846 A | 10/1999 |
| KR | 10-2012-0048905 A | 5/2012 |

OTHER PUBLICATIONS

Korean Office Action dated Apr. 14, 2016 issued in Korean Patent Application No. 10-2015-0057314 (English ranslation).

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

A multilayer ceramic electronic component includes a plurality of dielectric layers; and internal electrodes disposed on the dielectric layers and containing an additive. The additive contains lithium (Li) and a dielectric material.

14 Claims, 6 Drawing Sheets

I-I'

MULTILAYER CERAMIC ELECTRONIC COMPONENT AND METHOD OF MANUFACTURING THE SAME

CROSS-REFERENCE TO RELATED APPLICATION

This application claims the benefit of priority to Korean Patent Application No. 10-2015-0057314, filed on Apr. 23, 2015 with the Korean Intellectual Property Office, the entirety of which is incorporated herein by reference.

TECHNICAL FIELD

The present disclosure relates to a multilayer ceramic electronic component and a method of manufacturing the same.

BACKGROUND

Electronic components using a ceramic material, such as capacitors or the like, include a body formed of the ceramic material, internal electrodes formed in the body, and external electrodes installed on external surfaces of the body and connected to the internal electrodes.

A barium titanate ($BaTiO_3$)-based material may be used as a dielectric material used in a multilayer ceramic capacitor, or the like, and the dielectric material may affect characteristics of electronic components.

SUMMARY

Internal electrodes and dielectric layers included in a body of a multilayer electronic component may be simultaneously sintered to form the body. In a case of decreasing differences in sintering properties between the internal electrodes and the dielectric layers and improving interfacial characteristics of the internal electrodes and the dielectric layers, characteristics of the multilayer ceramic electronic component may be improved.

An aspect of the present disclosure provides a multilayer ceramic electronic component in which differences in sintering properties between internal electrodes and dielectric layers may be decreased and close adhesion between the internal electrodes and the dielectric layers may be improved, and a method of manufacturing the same.

According to an aspect of the present disclosure, there is provided a multilayer ceramic electronic component in which differences in sintering properties between internal electrodes and dielectric layers may be decreased and close adhesion between the internal electrodes and the dielectric layers may be improved by including internal electrodes and dielectric layers which are alternately disposed and contain an additive containing lithium trapped in the internal electrodes, and a method of manufacturing the same.

According to another aspect of the present disclosure, there is provided a multilayer ceramic electronic component including internal electrodes and dielectric layers, wherein a concentration of lithium (Li) in the vicinity of interfaces of the dielectric layers with the internal electrodes is equal to or higher than a concentration of lithium (Li) in the center of the dielectric layer in a thickness direction.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
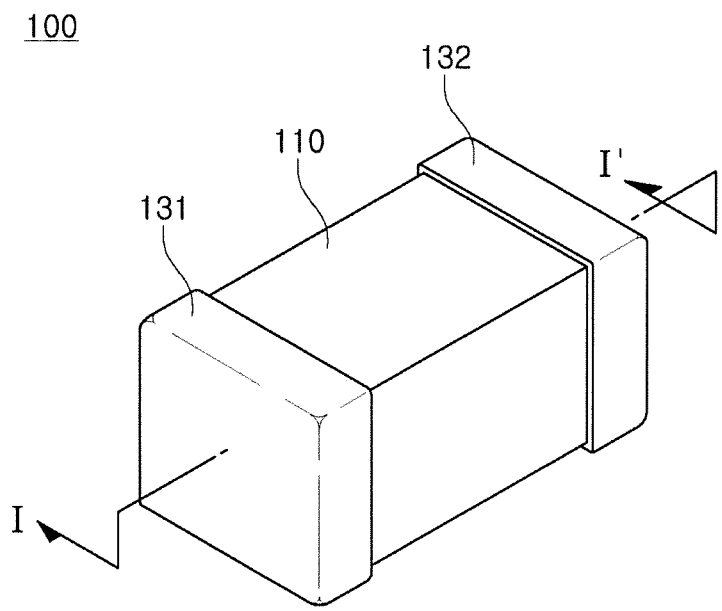
FIG. 1 is a perspective view illustrating a multilayer ceramic electronic component according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "upper," or "above" other elements would then be oriented "lower," or "below" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Figure 2:
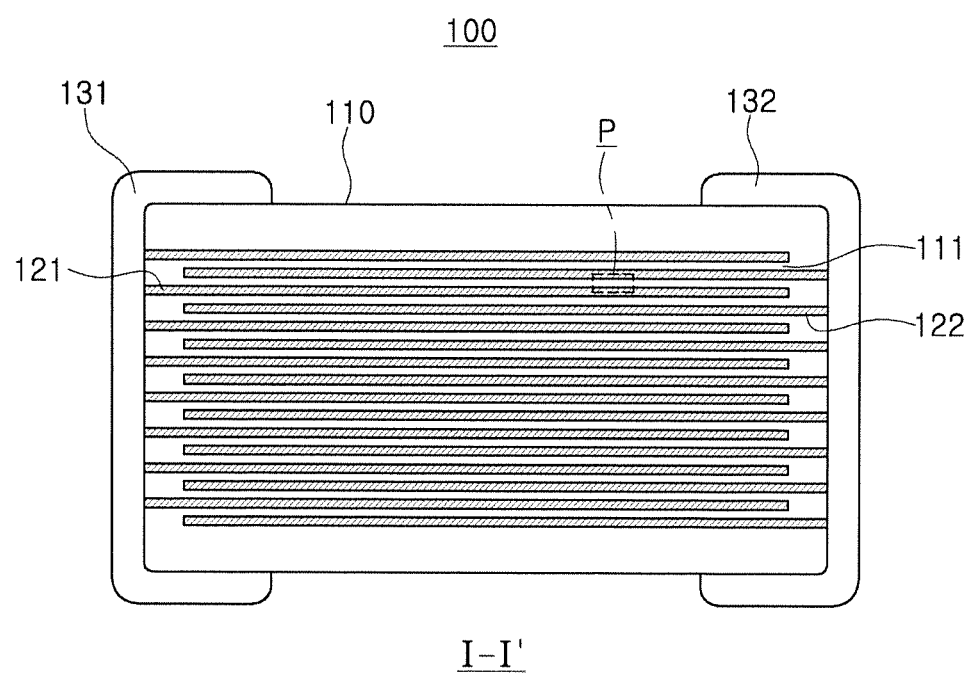
FIG. 2 is a cross-sectional view taken along line I-I' of FIG. 1.

FIG. 1 is a perspective view illustrating a multilayer ceramic electronic component 100 according to an exemplary embodiment in the present disclosure, and FIG. 2 is a schematic cross-sectional view of the multilayer ceramic electronic component 100, taken along line I-I' of FIG. 1.

Referring to FIGS. 1 and 2, the multilayer ceramic electronic component 100 according to the exemplary embodiment may include a body 110; and external electrodes 131 and 132 disposed on outer surfaces of the body.

The body 110 may include an active part as a portion contributing to capacitance formation in the electronic component and upper and lower cover layers formed on upper and lower surfaces of the active part as upper and lower margin parts, respectively. The active part may include dielectric layers 111 and internal electrodes 121 and 122 and may be formed by stacking the dielectric layers 111 on which the internal electrodes 121 and 122 are printed.

According to the exemplary embodiment, a shape of the body 110 is not particularly limited, but may be substantially hexahedral. Since at the time of sintering an electronic component, a difference in thickness is generated according to the sintering shrinkage of ceramic powder and the presence or absence of an internal electrode pattern, and edge portions of the body are polished, the body 110 does not have a perfectly hexahedral shape but may have a substantially hexahedral shape.

The internal electrodes 121 and 122 may be alternately stacked with the dielectric layers 111 and electrically insulated from each other by the dielectric layer 111 interposed between the internal electrodes.

The internal electrodes 121 and 122 may include first and second internal electrodes 121 and 122, and the first and second internal electrodes may be alternately stacked on the dielectric layers.

A thickness and the number of stacked internal electrodes 121 and 122 may be determined depending on intended use.

The internal electrodes 121 and 122 may contain nickel (Ni), copper (Cu), palladium (Pd), or an alloy thereof, but are not limited thereto.

A conductive material contained in the first and second internal electrodes 121 and 122 is not particularly limited, but nickel (Ni) may be used.

The dielectric layer 111 may contain a ceramic composition having high permittivity. For example, the dielectric layer 111 may contain a barium titanate ($BaTiO_3$) based dielectric material.

In the present specification, the barium titanate ($BaTiO_3$) based dielectric material may be pure barium titanate or a compound in which other addition elements are doped in a Ba site (A site) and a Ti site (B site) of barium titanate.

Figure 3:
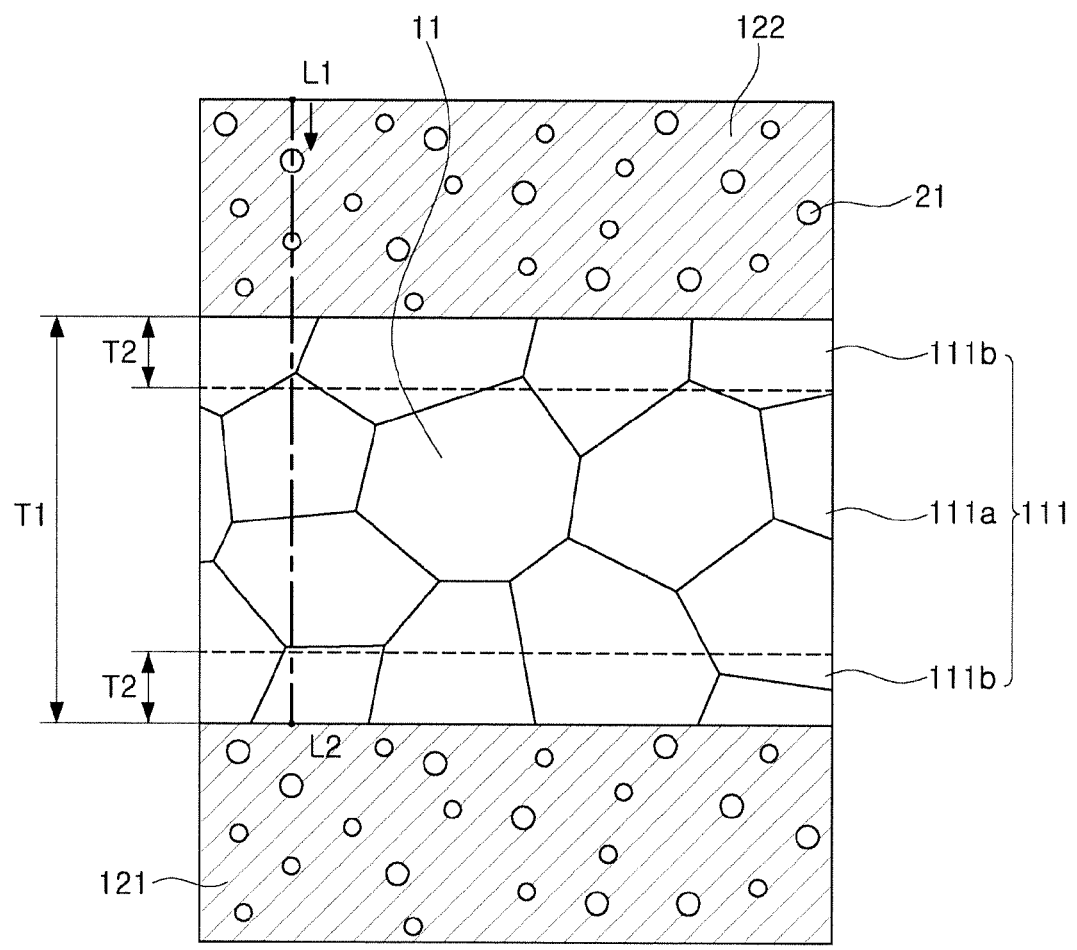
FIG. 3 is an enlarged view of section P of FIG. 2.

FIG. 3 is an enlarged view schematically illustrating section P of FIG. 2.

As illustrated in FIG. 3, according to the exemplary embodiment, the internal electrodes 121 and 122 may contain an additive 21 trapped therein.

The additive 21 may contain lithium (Li) and a dielectric material, wherein the dielectric material may be, for example, a barium titanate based material.

For example, lithium may be contained in the additive in a form of Li, LiCN, LiOH, $LiOOCCH_3$, $Li_2CO_3$, $LiClO_4$, $Li_2NO_3$, $Li_2O$, $Li_2SO_4$, $Li_2S$, $Li_2B_4O_7$, LiH, $LiNH_2$, $CH_3OLi$, $CH_3CH_2OLi$, LiCl, $Li_3N$, $Li_2TiO_3$, $Li_4Ti_5O_{12}$, LiOCl, $Li_2CO_3$, $Li_2SO_3$, $Li_2O$, or $Li_2O_2$.

For example, the additive according to the exemplary embodiment may be formed by coating the lithium containing material as described above on a surface of the dielectric material. However, a method of forming the additive is not limited thereto.

In a case in which the additive 21 containing lithium and the dielectric material is trapped in the internal electrodes as in the exemplary embodiment, differences in sintering properties between the internal electrodes 121 and 122 and the dielectric layers 111 may be decreased. Thus, a sintering temperature range may be enlarged and connectivity of the internal electrodes may be improved.

Although described again in a method of manufacturing a multilayer ceramic electronic component to be described below, the internal electrodes 121 and 122 and the dielectric layers 111 may be formed by applying an internal electrode paste to a plurality of ceramic green sheets forming the dielectric layers and stacking and sintering the stacked ceramic green sheets.

According to the exemplary embodiment, the internal electrode paste forming the internal electrodes may contain the additive containing lithium and the dielectric material, and thus the differences in sintering properties between the internal electrodes and the dielectric layers may be decreased.

Further, while the body is sintered, a part of the additive contained in the internal electrode paste may be trapped in the internal electrodes to increase a sintering temperature of the internal electrodes, thereby improving strength of the internal electrodes while delaying the sintering of the internal electrodes, and improving connectivity of the internal electrodes.

Another part of the additive contained in the internal electrode paste may be released from the internal electrode paste while the internal electrode paste is sintered, thereby forming the dielectric layers together with a dielectric material contained in the ceramic green sheets.

In this case, a part of lithium (Li) contained in the additive released from the internal electrode paste may be diffused while the body is sintered, thereby decreasing a sintering temperature of the dielectric layers. Therefore, the differences in sintering properties between the internal electrodes and the dielectric layers may be decreased, and grain growth of the dielectric material may be promoted, and thus the multilayer ceramic electronic component may have improved dielectric properties.

The additive released to interfaces between the dielectric layers and the internal electrodes during the sintering may promote the sintering at the interfaces, thereby improving connectivity between the internal electrodes and the dielectric layers. Therefore, interface adhesive strength between the internal electrodes 121 and 122 and the dielectric layers 111 may be effectively improved, and thus moisture resistance of the multilayer ceramic electronic component may be improved.

Meanwhile, the additive may be lithium-containing barium titanate powder, and a content of lithium in the additive may be 1 to 20 moles based on 100 moles of barium contained in barium titanate in the additive.

According to the exemplary embodiment, a sintering profile of the body may be adjusted so that a part of the additive contained in the internal electrode paste is mainly distributed in the interfaces between the internal electrodes and the dielectric layers.

In a case in which the sintering profile of the body is adjusted so that the part of the additive containing lithium (Li) is mainly distributed in the interfaces between the internal electrodes and the dielectric layers, lithium (Li) may promote the sintering of the dielectric material, and thus the dielectric layer may be able to be sintered at a low temperature.

Further, as the sintering at the interfaces of the internal electrodes and the dielectric layers is promoted, close adhesive force between the internal electrodes and the dielectric layers may be improved, and aggregation of the internal electrodes and the dielectric layers may be suppressed, wherein short-circuiting of the multilayer ceramic electronic component may be suppressed and the multilayer ceramic electronic component may have high resistance, thereby improving reliability.

Further, since the additive formed of lithium and the dielectric material may be in a liquid state at a low temperature as compared to an additive formed of a dielectric material that does not contain lithium, the additive may promote grain growth of the dielectric material while being rapidly absorbed by the dielectric material contained in the ceramic green sheets, thereby improving dielectric properties of the multilayer ceramic electronic component.

In addition, the content of lithium contained in the additive may be controlled by controlling a size of dielectric grains 11 contained in the dielectric layers 111.

The additive that is not released from the internal electrode paste during sintering the internal electrode paste and the ceramic green sheets may remain in the internal electrodes after sintering, thereby serving to improve adhesive strength between the internal electrodes and the dielectric layers or increase a breakdown voltage.

According to the exemplary embodiment, a size of the additive trapped in the internal electrodes after sintering may be 1 nm to 200 nm.

According to the exemplary embodiment, an area occupied by the additive 21 in a cross-sectional area of the internal electrodes 121 and 122 may be 1% to 40%.

The cross-sectional area of the internal electrodes may mean an area including a cross-sectional area of the additive trapped in the internal electrodes.

When the cross-sectional area occupied by the additive 21 in the cross-sectional area of the internal electrodes 121 and 122 is less than 1%, an effect of improving adhesive strength between the internal electrodes and the dielectric layers is not sufficient, such that an effect of increasing moisture load resistance may be insufficient.

Further, when the cross-sectional area occupied by the additive 21 in the cross-sectional area of the internal electrodes 121 and 122 is more than 40%, a short-circuit occurrence rate may be increased due to an aggregation phenomenon of the internal electrodes, and connectivity of electrodes may be decreased.

According to the exemplary embodiment, the additive 21 trapped in the internal electrodes may be lithium-containing barium titanate powder. In this case, at the time of performing secondary ion mass spectrometry (SIMS) on the additive trapped in the internal electrodes, an area intensity (Li/Ti) of lithium with respect to titanium may be 0.030% to 20%.

When the area intensity is less than 0.030%, it may be difficult to have moisture load resistance. When the area intensity is more than 20%, however, the short-circuit occurrence rate may be increased due to aggregation of the internal electrodes, and connectivity of the electrodes may be decreased.

According to the exemplary embodiment, as illustrated in FIG. 3, the dielectric layer 111 may include first regions 111b adjacent to the internal electrodes 121 and 122 in a single dielectric layer 111 and a second region 111a disposed between the first regions 111b, and a concentration of lithium in the first region may be equal to or higher than a concentration of lithium in the second region.

For example, the dielectric layer 111 may have a concentration gradient of lithium (Li) in a single dielectric layer in a thickness direction.

A part of or all of lithium present in the dielectric layer 111 may be contained in the dielectric layer while the additive contained in the internal electrode paste is released from the internal electrode paste during the sintering to thereby form a portion of the dielectric layer.

The concentration of lithium in the first region 111b may be equal to or higher than that in the second region 111a.

In this case, the concentration of lithium (Li) in the first region 111b in the dielectric layer may be equal to or higher than that in the second region 111a by adjusting the sintering profile.

The first and second regions 111b and 111a are not separated from each other in the dielectric layer but may be formed integrally with each other and distinguished by distance from the internal electrodes.

According to the exemplary embodiment, the first region 111b may be defined as a region of which a distance from an interface between the internal electrode and the dielectric layer is within 20% of a thickness of the dielectric layer.

The first regions 111b may be formed on both portions of the dielectric layers in the thickness direction, and a sum of thicknesses (t2) of the first regions 111b in a single dielectric layer 111 may be 40% of a thickness (t1) of the dielectric layer 111.

When the concentration of lithium (Li) in the first region 111b is equal to or higher than that in the second region 111a, moisture load resistance may be efficiently improved.

The content of lithium (Li) in the first region 111b may be higher than that in the second region 111a.

The content of lithium (Li) in the first region 111b adjacent to the internal electrode in the dielectric layer may be 1 to 3 times the content of lithium (Li) in the second region 111a in the dielectric layer.

For example, at the time of performing inductively coupled plasma (ICP) analysis of the dielectric layer, a detection amount of lithium (Li) in the first region 111b may be 100 to 300% of a detection amount of lithium (Li) in the second region 111a in the dielectric layer.

When the content of lithium (Li) in the first region is less than 100% of the content of lithium (Li) in the second region, the multilayer ceramic electronic component may not have moisture load resistance, and the short-circuit occurrence rate may be increased. Further, in a case in which the content of lithium (Li) in the first region is more than 300% of the content of lithium (Li) in the second region, connectivity of the electrode, a breakdown voltage (BDV), and resistivity may be decreased.

According to the exemplary embodiment, at the time of performing the ICP analysis of the dielectric layer 111, a molar concentration of detected lithium (Li) may be 0.010% to 5% based on barium titanate.

At the time of performing the ICP analysis of the dielectric layer 111, in a case in which the molar concentration of lithium (Li) is less than 0.010% based on barium titanate, moisture load resistance may not be improved. When the molar concentration is more than 5%, however, aggregation of the internal electrodes may be intensified, such that the short-circuit occurrence rate may be increased, and connectivity of the electrode may be decreased.

Referring to FIGS. 1 and 2 again, the upper and lower cover layers included in the body may be formed by stacking a single or two or more dielectric layers on upper and lower surfaces of the active part in a vertical direction, respectively, and may serve to prevent the internal electrodes 121 and 122 from being damaged by physical or chemical stress.

The first and second external electrodes 131 and 132 may be disposed on both end portions of the body 110, respectively, and electrically connected to exposed end portions of the first and second internal electrodes 121 and 122, respectively, thereby configuring a capacitor circuit.

Although not limited thereto, the external electrodes may contain copper (Cu) as a conductive material. Although not limited, the external electrodes 131 and 132 may further contain glass and may be formed using an external electrode paste containing the conductive material and the glass. The glass may be contained in the external electrode paste in glass frit form.

The external electrodes may be formed by sintering the external electrode paste.

Figure 4A:
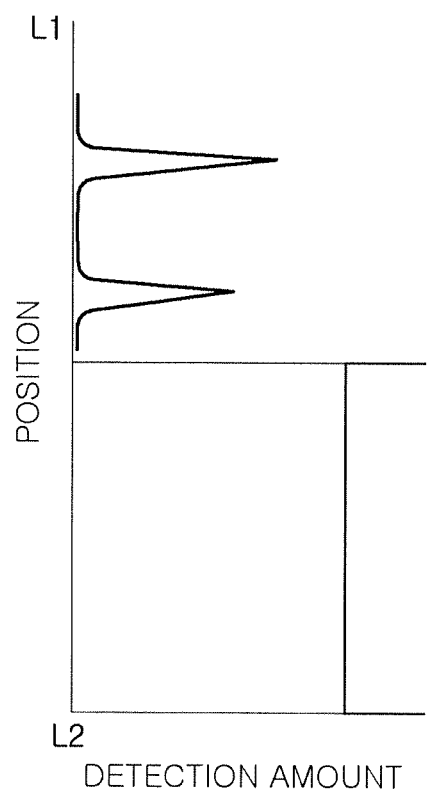
FIGS. 4A and 4B are graphs schematically illustrating concentration distribution of a base material main ingredient and lithium (Li) online L1-L2 of FIG. 3 in order to illustrate concentrations of the base material main ingredient and lithium (Li) contained in the multilayer ceramic electronic component according to the exemplary embodiment.
Figure 4B:
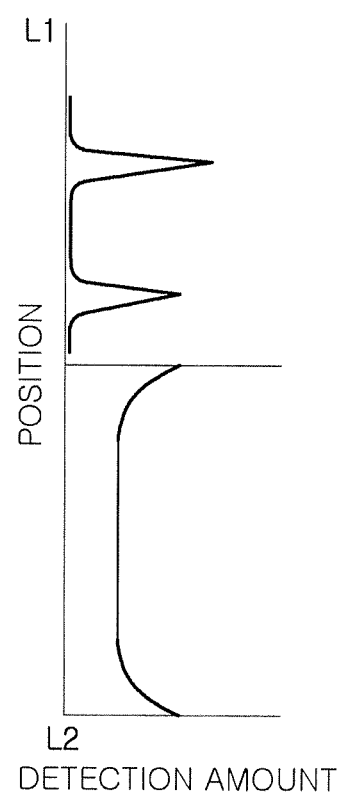

FIGS. 4A and 4B are graphs schematically illustrating concentration distribution that a dielectric main ingredient and lithium (Li) may have along line L1-L2 of FIG. 3 in order to illustrate concentrations of the dielectric main ingredient and lithium (Li) contained in the multilayer ceramic electronic component according to the exemplary embodiment. However, concentration distribution of the dielectric main ingredient and lithium is not necessarily limited thereto.

FIG. 4A illustrates concentration distribution that elements of the dielectric main ingredient may have. The elements of the dielectric main ingredient may be barium (Ba) and titanium (Ti).

As illustrated in FIG. 4A, it may be confirmed that the dielectric layer may relatively uniformly contain the elements of the dielectric main ingredient in a single dielectric layer and the elements of the dielectric main ingredient are detected in a region in which the additive is disposed in the internal electrode. FIG. 4B illustrates concentration distribution that lithium (Li) contained in the additive added to the internal electrode paste may have.

In this case, lithium (Li) may be detected in the region in which the additive is disposed and the dielectric layer and a large amount of lithium (Li) may be detected in the first region than the second region in a single dielectric layer as illustrated in FIG. 4B.

Figure 5:
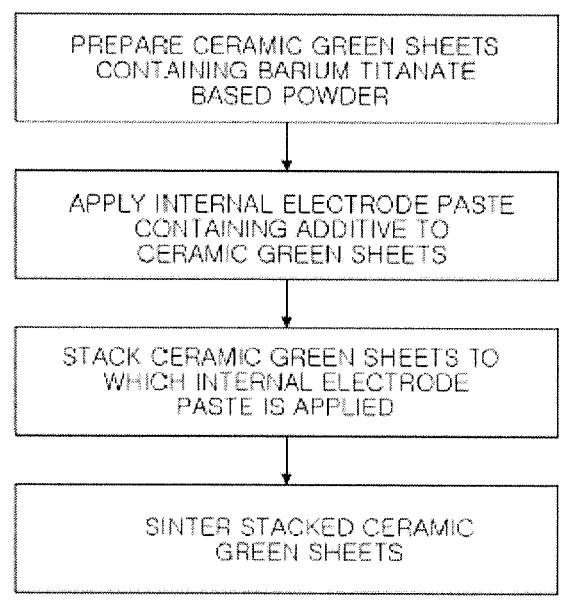
FIG. 5 is a flow chart illustrating a method of manufacturing a multilayer ceramic electronic component according to another exemplary embodiment in the present disclosure.

FIG. 5 is a flow chart illustrating a method of manufacturing a multilayer ceramic electronic component according to another exemplary embodiment in the present disclosure.

Referring to FIG. 5, the method of manufacturing a multilayer ceramic electronic component according to another exemplary embodiment may include steps of: preparing ceramic green sheets containing barium titanate based powder (S1); applying an internal electrode paste contain an additive onto the ceramic green sheets (S2); stacking the ceramic green sheets on which the internal electrode paste is applied to form a multilayer body (S3); and sintering the multilayer body to prepare a body (S4).

In the step of preparing the plurality of ceramic green sheets (S1), dielectric slurry containing the barium titanate based powder may be applied and dried onto a carrier film.

The step of applying the internal electrode paste (S2) may be performed by printing the internal electrode paste on the ceramic green sheets, but a method of forming an internal electrode pattern is not limited thereto.

The internal electrode paste may be an electrode material and may contain nickel (Ni), copper (Cu), palladium (Pd), or an alloy thereof, but is not limited thereto.

According to the exemplary embodiment, the internal electrode paste may contain the additive, wherein the additive may contain lithium (Li) and a dielectric material.

According to the exemplary embodiment, a particle size of the additive contained in the internal electrode paste may be 1 nm to 50 nm, preferably 1 nm to 30 nm.

When the particle size of the additive is less than 1 nm, an effect of suppressing a necking phenomenon between conductive materials (for example, nickel) contained in the internal electrode paste may be insufficient, and thus connectivity of internal electrodes may be deteriorated.

Further, when the particle size of the additive is more than 50 nm, the additive contained in the internal electrode paste may be rapidly released toward interfaces between the internal electrodes and the ceramic green sheets during the sintering. Thus, the additive may not properly perform a function of suppressing the sintering of the internal electrodes, which may deteriorate connectivity of the internal electrodes.

When the particle size of the additive is 1 nm to 50 nm, connectivity of the internal electrodes may be improved, and thus dielectric properties of the multilayer ceramic electronic component may be improved.

The additive that is not released toward the interfaces during the sintering may remain in the internal electrodes. A particle size of the additive trapped to remain in the internal electrodes after sintering may be 1 nm to 200 nm due to grain growth of the additive during the sintering. For example, the particle size of the additive trapped to remain in the internal electrodes may be 1 nm to 100 nm.

Next, the multilayer body may be formed by stacking the ceramic green sheets on which the internal electrode pattern is formed (S3). Further, in order to form upper and lower cover layers, the ceramic green sheets on which the internal electrode pattern is not formed may be stacked on upper and lower surfaces of the multilayer body of the ceramic green sheet on which the internal electrode pattern is formed.

Then, the body including the internal electrodes and dielectric layers may be formed by sintering the multilayer body (S4).

According to the exemplary embodiment, the method of manufacturing a multilayer ceramic electronic component may further include, before the sintering of the ceramic multilayer body, pressing the multilayer body and cutting the pressed multilayer body into individual electronic components so that ends of the internal electrode patterns are alternately exposed to cutting surfaces.

According to the exemplary embodiment, a part of the additive contained in the internal electrode paste may be released to the interfaces between the internal electrodes and the ceramic green sheets during the sintering of the multilayer body, thereby forming the dielectric layers together with the ceramic green sheets.

According to the exemplary embodiment, a part of the additive contained in the internal electrode paste may be released from the internal electrode paste during the sintering to form a portion (mainly disposed in the interfaces) of the dielectric layer, and the remainder of the additive may remain in the internal electrodes by adjusting a sintering profile.

For example, the additive contained in the internal electrode paste may be smoothly released to the interfaces using a difference in sintering properties between an electrode material and the additive contained in the internal electrode by rapidly increasing a temperature in a predetermined region during the sintering.

Thereafter, external electrodes may be formed by applying an external electrode paste on outer surfaces of the body. Application of the external electrode paste may be performed by dipping the body in the external electrode paste, but is not limited thereto.

According to the exemplary embodiment, the external electrode paste may contain nickel (Ni), copper (Cu), palladium (Pd), gold (Au), silver (Ag), or an alloy thereof, but the material of the external electrode paste is not limited thereto.

The external electrodes may be formed by sintering the external electrode paste applied to the body.

Among descriptions of the method of manufacturing a multilayer ceramic electronic component according to the present exemplary embodiment, a description overlapping the description of the multilayer ceramic electronic component according to the exemplary embodiment of the present disclosure described above will be omitted.

Experimental Example

Inventive Example 1) An internal electrode paste containing lithium-containing barium titanate ($BaTiO_3$) powder as an additive was prepared. 10 moles of lithium was contained in the additive based on 100 moles of barium titanate.

Meanwhile, after adding a sintering additive, a binder, and an organic solvent such as ethanol, or the like, to dielectric raw material powder containing barium titanate ($BaTiO_3$) powder and wet-mixing with each other to prepare a dielectric slurry, the prepared dielectric slurry was applied and dried on a carrier film, thereby forming ceramic green sheets.

Next, after printing the internal electrode paste containing the additive on the ceramic green sheets, the ceramic green sheets on which an internal electrode pattern was printed were stacked, thereby forming a multilayer body. Then, the formed multilayer body was compressed and cut.

Next, after heating the cut multilayer body to remove the binder, the multilayer body was sintered at a high temperature of 1000° C. or more under a reducing atmosphere, thereby forming a body. In the present sintering, 5% of the additive was allowed to be trapped in internal electrodes based on an entire area of the internal electrodes by adjusting a sintering profile. The additive that was not trapped in the internal electrodes was released from interfaces between the internal electrodes and dielectric layers, and the additive was not diffused to the entire dielectric layers by sintering the dielectric material after the additive was released to the interfaces.

External electrodes connected to the internal electrodes were formed by applying and sintering an external electrode paste containing glass frit and copper on both end surfaces of the body manufactured as described above.

Comparative Example 1) An internal electrode paste containing lithium (Li)-free barium titanate ($BaTiO_3$) powder as an additive was prepared. Other conditions were the same as in Inventive Example 1 except that the lithium (Li)-free barium titanate ($BaTiO_3$, hereinafter, referred to as 'BT') powder was mixed in the internal electrode paste as the additive.

Figure 6A:
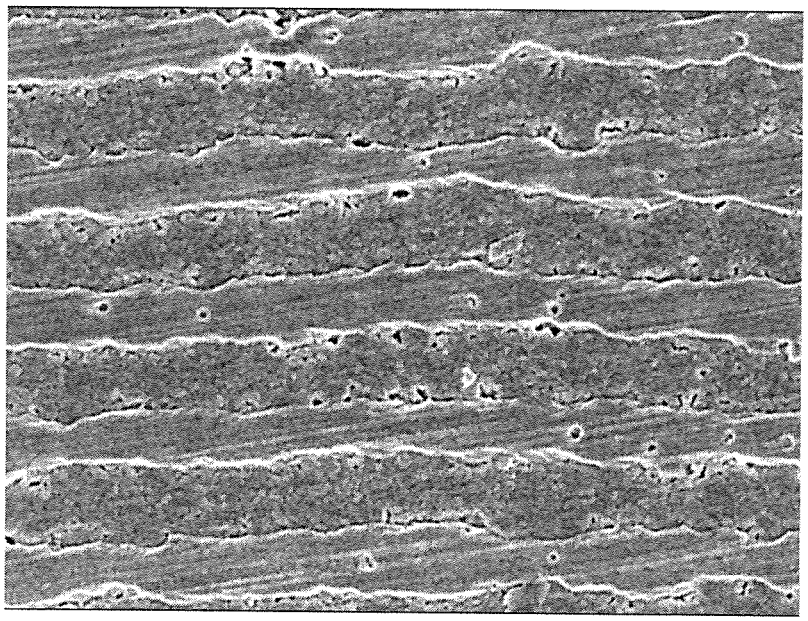
FIGS. 6A and 6B are scanning electron microscope (SEM) photographs obtained by cutting multilayer ceramic electronic components to view cross sections of internal electrodes and dielectric layers in order to compare degrees of densification of interfaces between internal electrodes and dielectric layers of multilayer ceramic electronic components according to Inventive Examples and Comparative Examples, respectively.
Figure 6B:
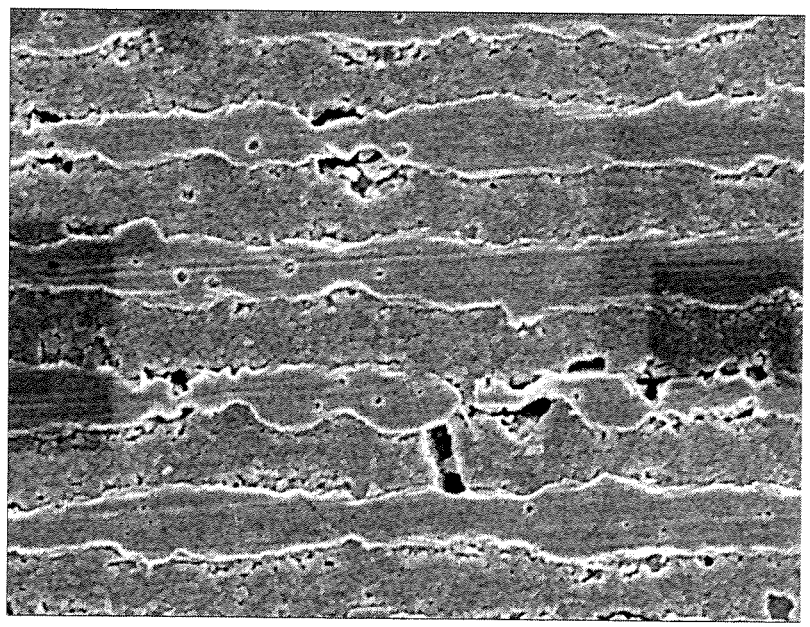

FIGS. 6A and 6B are scanning electron microscope (SEM) photographs obtained by cutting multilayer ceramic electronic components to view cross sections of internal electrodes and dielectric layers in order to compare degrees of densification of interfaces between internal electrodes and dielectric layers of multilayer ceramic electronic components according to Inventive Example 1 and Comparative Example 1, respectively.

As shown in FIG. 6A (Inventive Example 1) and FIG. 6B (Comparative Example 1), in Inventive Example 1, the degree of densification in the interfaces between the internal electrodes and the dielectric layers was better than that in Comparative Example 1.

Figure 7A:
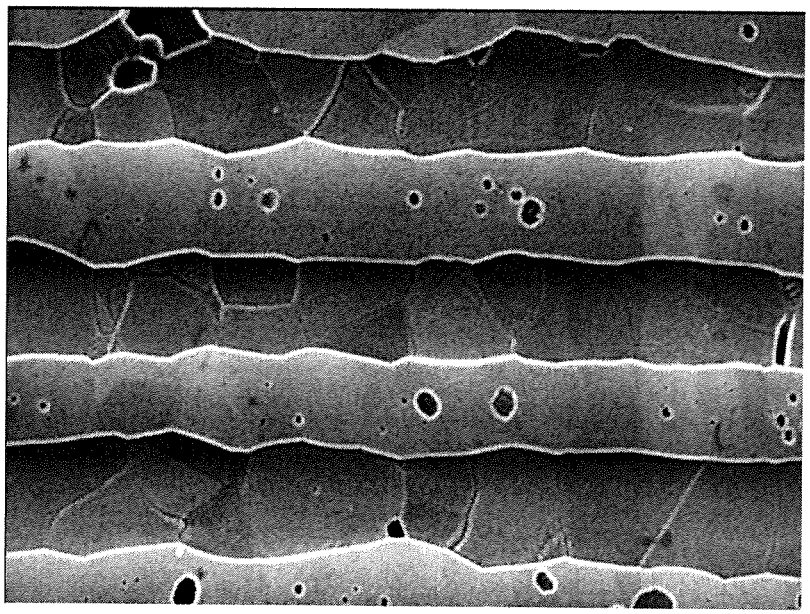
FIGS. 7A and 7B are scanning electron microscope (SEM) photographs obtained by cutting multilayer ceramic electronic components to view cross sections of internal electrodes and dielectric layers in order to compare connectivity of internal electrodes and grain sizes of dielectric layers of multilayer ceramic electronic components according to Inventive Examples and Comparative Examples, respectively.
Figure 7B:
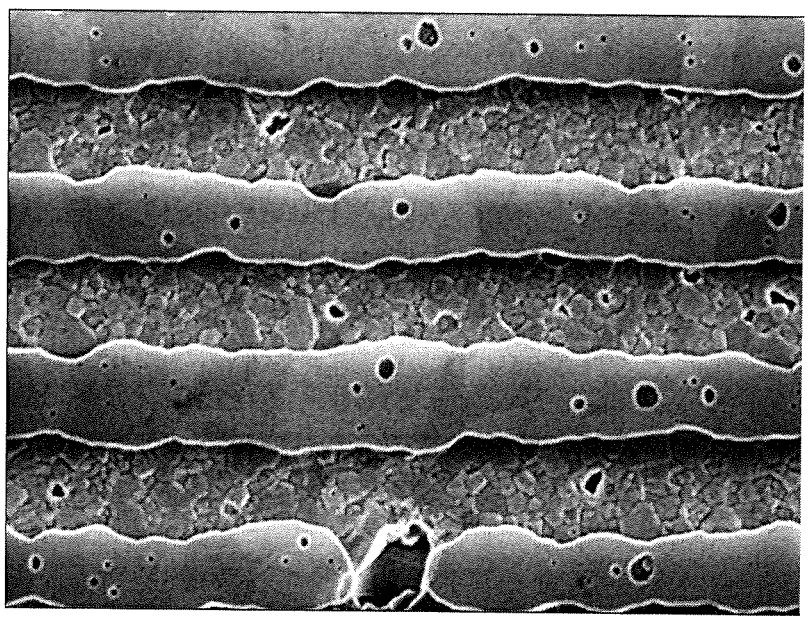

FIGS. 7A and 7B are scanning electron microscope (SEM) photographs obtained by cutting multilayer ceramic electronic components to view cross sections of internal electrodes and dielectric layers in order to compare connectivity of the internal electrodes and grain sizes of the dielectric layers of multilayer ceramic electronic components according to Inventive Example 1 and Comparative Example 1, respectively.

As shown in FIG. 7A (Inventive Example 1) and FIG. 7B (Comparative Example 1), in Inventive Example 1, connectivity of the internal electrodes was better than that in Comparative Example 1, and a size of grains contained in the dielectric layers was larger than that in Comparative Example 1.

The following Table 1 contains data obtained by measuring capacitance, connectivity of the internal electrodes, breakdown voltages (BDVs), short-circuit occurrence rates, and moisture load defect rates of the multilayer ceramic electronic components according to Inventive Example 1 and Comparative Example 1.

At the time of measuring the moisture load defect rate, after applying a rated direct current (DC) voltage of 6.3 V to the multilayer ceramic electronic component in a constant temperature and constant humidity chamber (40±2° C., relative humidity: 90-95%) for about 500 hours, a capacitance change rate was measured, and a case in which the capacitance change rate was 12.5% or more was evaluated as defective.

TABLE 1

|  | Capacitance | Connectivity of Internal Electrode | BDV | Short-Circuit Occurrence Rate | Moisture Load Defect Rate |
|---|---|---|---|---|---|
| Inventive Example 1 | 120% | 98% | 63 V | 0/40 | 0/40 |
| Comparative Example 1 | 100% | 90% | 53 V | 13/40 | 5/40 |

In Table 1, the capacitance of the multilayer ceramic electronic component in Inventive Example 1 is relative capacitance when the capacitance of the multilayer ceramic electronic component in Comparative Example 1 was considered as 100%.

Referring to Table 1, it may be confirmed that the capacitance of the multilayer ceramic electronic component in Inventive Example 1 was increased by 20% as compared to Comparative Example 1, and the BDV thereof was increased by 10 V.

Further, in Inventive Example 1, the measured moisture load defect rate was 0%.

As set forth above, according to exemplary embodiments in the present disclosure, a multilayer ceramic electronic component having improved moisture load resistance and improved moisture resistance is provided, and a method of manufacturing the same is also provided.

In addition, according to exemplary embodiments, a sintering temperature range of the multilayer ceramic electronic component is enlarged, and connectivity of the internal electrodes and permittivity are improved, and the method of manufacturing the same may be provided.

Further, according to exemplary embodiments, short-circuit defects and vertical cracks in the multilayer ceramic electronic component may be suppressed.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a plurality of dielectric layers; and
internal electrodes disposed on the dielectric layers and containing an additive,
wherein the additive contains lithium (Li) and a dielectric material, and
a cross-sectional area occupied by the additive is 1% to 40% of a total cross-sectional area of the internal electrodes.

2. The multilayer ceramic electronic component of claim 1, wherein the additive is a dielectric material coated with lithium (Li).

3. The multilayer ceramic electronic component of claim 1, wherein the dielectric material is a barium titanate based material.

4. The multilayer ceramic electronic component of claim 1, wherein the dielectric layers contain lithium (Li).

5. The multilayer ceramic electronic component of claim 4, wherein a content of lithium (Li) in first regions adjacent to the internal electrodes in the dielectric layer is 1 to 3 times a content of lithium (Li) in a second region disposed between the first regions of the dielectric layer.

6. The multilayer ceramic electronic component of claim 1, wherein an area intensity of lithium with respect to titanium is 0.030% to 20% when secondary ion mass spectrometry (SIMS) is performed on the additive trapped in the internal electrodes.

7. A multilayer ceramic electronic component comprising:
a plurality of dielectric layers; and
internal electrodes disposed on the dielectric layers and containing an additive,
wherein the additive contains lithium (Li) and a dielectric material,
the dielectric layers contain a barium titanate based dielectric material, and
in the dielectric layers, a molar concentration of lithium (Li) is 0.010% to 5% based on barium titanate.

8. The multilayer ceramic electronic component of claim 1, wherein a size of the additive trapped in the internal electrodes is 1 nm to 200 nm.

9. A multilayer ceramic electronic component comprising:
a plurality of dielectric layers; and
internal electrodes disposed alternately with the dielectric layers and containing a lithium-containing additive,
wherein the dielectric layers have a concentration gradient of lithium (Li) in a thickness direction of a single dielectric layer, and
a cross-sectional area occupied by the additive is 1% to 40% of a total cross-sectional area of the internal electrodes.

10. The multilayer ceramic electronic component of claim 9, wherein the dielectric layer includes first regions adjacent to the internal electrodes and a second region disposed between the first regions in a single dielectric layer, the first region having a lithium concentration higher than that of the second region.

11. The multilayer ceramic electronic component of claim 9, wherein the additive is a barium titanate based dielectric material containing lithium (Li).

12. The multilayer ceramic electronic component of claim 9, wherein the additive is a barium titanate based dielectric material coated with lithium (Li).

13. The multilayer ceramic electronic component of claim 9, wherein an area intensity of lithium with respect to titanium is 0.030% to 20% when secondary ion mass spectrometry (SIMS) is performed on the additive trapped in the internal electrodes.

14. The multilayer ceramic electronic component of claim 9, wherein the dielectric layers contain a barium titanate based dielectric material, and
in the dielectric layers, a molar concentration of lithium (Li) is 0.010% to 5% based on barium titanate.

* * * * *